United States Patent [19]
Jurd et al.

[11] 3,915,889
[45] Oct. 28, 1975

[54] DIHYDROCINNAMYL PHENOL ANTIMICROBIAL AGENTS

[75] Inventors: Leonard Jurd, Berkeley; Kenneth L. Stevens, Walnut Creek; Alfred Douglas King, Jr., Martinez, all of Calif.

[73] Assignee: The United States of America as represented by the Secretary of Agriculture, Washington, D.C.

[22] Filed: Apr. 2, 1973

[21] Appl. No.: 347,083

Related U.S. Application Data

[62] Division of Ser. No. 257,031, May 25, 1972, Pat. No. 3,775,541.

[52] U.S. Cl. .................. 252/404; 424/341; 424/346
[51] Int. Cl.² .................... C09K 15/08; A01N 9/26
[58] Field of Search ............ 252/404; 424/346, 341

[56] References Cited
UNITED STATES PATENTS
3,524,003    8/1970    Reinert et al. ....................... 424/346

OTHER PUBLICATIONS

Hurd et al., Journal Am. Chemical Soc., Vol., 59, pp. 107–109.
Barnes et al., Tetrahedron, Vol. 21, pp. 2707–2715.
Jurd, Experientia, Vol. 24, pp. 858–860.
Jurd, Tetrahedron, Vol. 25, pp. 1407–1416.
Jurd, Tetrahedron, Letters No. 33, pp. 2863–2866.
Thakar et al., Chem. Abst., Vol. 63 (1965), pp. 571–572.

*Primary Examiner*—Benjamin R. Padgett
*Assistant Examiner*—Irwin Gluck
*Attorney, Agent, or Firm*—M. Howard Silverstein; Max D. Hensley; William Takacs

[57] ABSTRACT

Substances which are subject to microbial spoilage are preserved by addition of a dihydrocinnamyl phenol, e.g., dihydro-2-cinnamyl-phenol, dihydro-4-cinnamyl-phenol, dihydro-2-cinnamyl-4-methylphenol, etc.

10 Claims, No Drawings

DIHYDROCINNAMYL PHENOL ANTIMICROBIAL AGENTS

A non-exclusive, irrevocable, royalty-free license in the invention herein described, throughout the world for all purposes of the United States Government, with the power to grant sublicenses for such purposes, is hereby granted to the Government of the United States of America.

This is a division of our copending application, Ser. No. 257,031, filed May 25, 1972, issued Nov. 27, 1973, as U.S. Pat. No. 3,775,541.

DESCRIPTION OF THE INVENTION

This invention relates to the preservation of substances which are normally subject to microbial spoilage. The objects of the invention include the provision of novel processes and compositions for accomplishing such preservation. Further objects of the invention will be evident from the following description wherein parts and percentages are by weight unless otherwise specified. The abbreviation "ppm" used herein refers to parts per million on a weight/volume (w/v) basis. Temperatures are given in degrees Centigrade. The symbol φ is used to designate the phenyl radical.

In accordance with the invention, it has been found that certain agents exhibit unexpected antimicrobial activity and are useful for preserving all kinds of materials which are normally subject to microbial spoilage. The agents in question are certain dihydrocinnamyl phenols, and their antimicrobial activity is unusual and unexpected because it is not shared by closely-related phenol derivatives.

Generically, the agents in accordance with the invention have the structure

I.
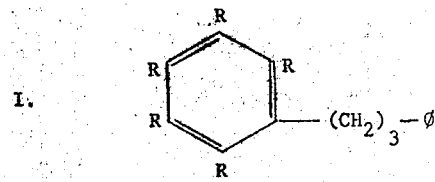

where at least one but not more than 3 of the R's are hydroxy, and the remainder of the R's are each independently selected from the group consisting of lower alkyl, lower alkoxy, and hydrogen.

The compounds of the invention are especially useful because they are active against many microorganisms, including those in the categories of bacteria, yeasts, and molds. In other words, the compounds are not just active against one or a few organisms; rather, they display broad-spectrum antimicrobial activity.

Examples of particular compounds within the scope of the invention are given below by way of illustration and not limitation:

Dihydro-4-cinamyl-phenol

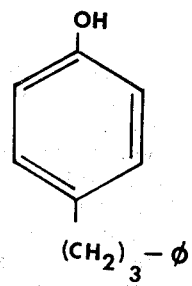

Dihydro-2-cinnamyl-phenol

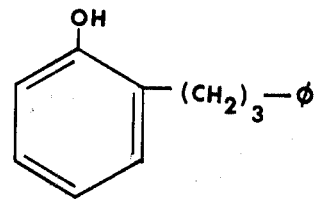

Dihydro-2-cinnamyl-4-methylphenol

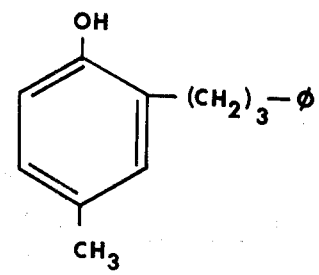

Dihydro-4-cinnamyl-2-methylphenol

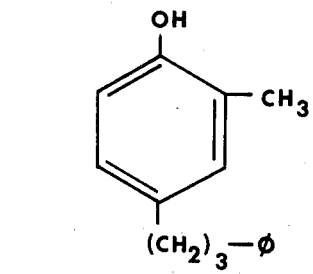

Dihydro-2-cinnamyl-4-ethylphenol

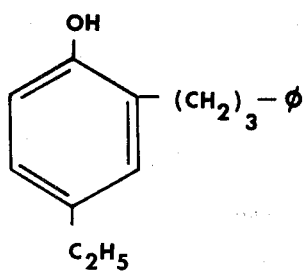

Dihydro-2-cinnamyl-4-n-propylphenol

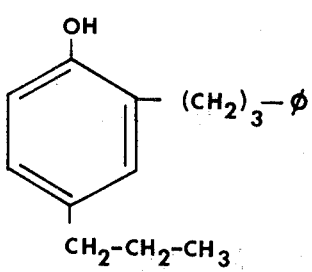

Dihydro-2-cinnamyl-4-isopropylphenol

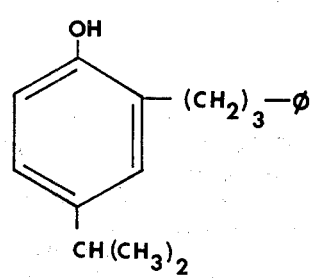

Dihydro-4-cinnamyl-
3-methyl-
6-isopropylphenol

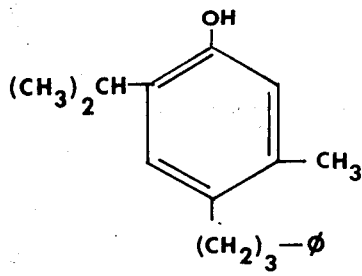

Dihydro-2-cinnamyl-
4-methoxyphenol

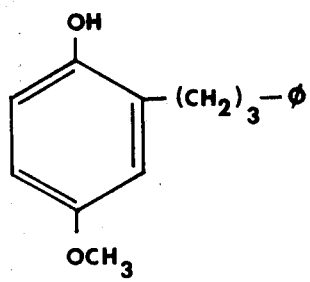

Dihydro-4-cinnamyl-
2-methoxyphenol

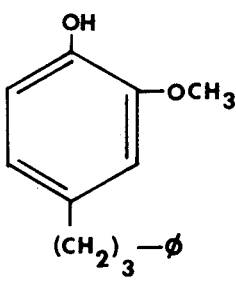

Dihydro-4-cinnamyl-
resorcinol

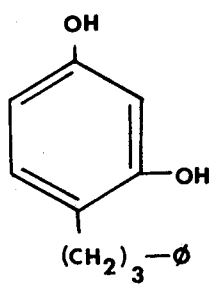

Dihydro-2-cinnamyl-
5-methoxy-quinol

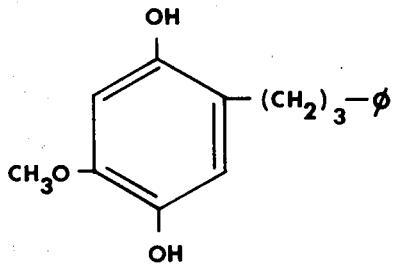

The invention encompasses not only the use of any of the above-described agents individually, but also mixtures thereof.

In preserving substances in accordance with the invention, any of the aforesaid agents or mixtures thereof are incorporated with the substance, using an amount of the agent to inhibit microbial growth. Additional conventional treatments such as dehydration, canning, refrigeration, or freezing may be applied to the substance containing the added agent. The incorporation of the agent with the substance may involve a mixing of the substance and the agent—this is especially suitable where the substance is in liquid or particulate form. Where the substance is in the form of pieces of large dimensions the agent may be incorporated therewith by coating it on the surface of the pieces. For such purpose the agent is preferably dispersed in a carrier—a liquid such as water, alcohol, water-alcohol blends, oils, or a finely-divided solid such as salt, starch, talc, or the like.

The invention is of wide versatility and can be applied for the preservation of all kinds of substances which are normally subject to microbial spoilage. Typical examples of such substances are listed below by way of example. Foodstuffs such as fruits, vegetables, juices, milk, eggs, meat, fish, grains, cereal products, cheese, etc. Animal glues and mucilages; dextrins; starch pastes and solutions; cosmetic, medicinal, and dental preparations; vitamin preparations; pastes, solutions, or other preparations of natural gums such as tragacanth, Arabic, acacia, karaya, locust bean, agar-agar, pectin, algin, etc.; fermentation broths, mashes, and residues from fermentation processes; whey; wines and vinegars; animal feeds and ingredients of animal feeds such as fish meals, blood meals, feather meal, meat scraps, bone meal, tankage, grains, and oil-seed meals; proteins and protein hydrolysates; textile printing pastes; paints containing proteins or other spoilable dispersing agents; solutions of bark extracts or other tanning agents; molasses; by-products or wastes that contain potentially valuable carbohydrate, proteinous or fat ingredients such as stick liquor, corn steep liquor, fruit cannery wastes, citrus peels, cull fruit and vegetables, tops of root vegetables, distillers' slops, pulp liquors, wash water from textile de-sizing operations, waste liquors from wool scouring plants, dairy and slaughter house wastes and liquors, etc.

The compounds of the invention display activities which are equal or even superior to those of widely-used antimicrobial agents. This is illustrated by the following: In general, the compounds of the invention are superior to such agents as phenol, resorcinol, o-phenyl-phenol, and the alkali metal sorbates and benzoates. For instance, the compounds of the invention, at concentrations of 12 to 25 ppm, were found to inhibit the growth of four bacteria (*Bacillus cereus, Sarcina lutea, Staphylococcus aureus,* and *Streptococcus lactis*), whereas to achieve the same effect it required 100 to 200 ppm of o-phenyl-phenol, more than 800 ppm of potassium sorbate, and more than 1,000 ppm of sodium benzoate.

Alkyl 4-hydroxybenzoates are well known to exhibit potent microbial activity. In general, the compounds of the invention display a superior activity as compared to these benzoates wherein the alkyl group contains less than seven carbon atoms. For instance, whereas the compounds of the invention at a concentration of 12 to 25 ppm will inhibit the growth of the four bacteria noted above, it requires concentrations of 100 to 400 ppm for the same result to be achieved with the $C_1$–$C_5$ alkyl 4-hydroxybenzoates. Moreover, it may be noted that the compounds of the invention have an advantage in that their water-solubility is higher than that of the higher alkyl (e.g., heptyl) 4-hydroxybenzoates, and that the compounds of the invention do not exhibit the strong and unpleasant odor which characterizes the said benzoates. Also, with respect to some microorganisms, the compounds of the invention inhibit growth when applied at levels less than required with the higher alkyl 4-hydroxybenzoates. This is the case, for example, with bacteria such as *Acaligenes faecelis* and *E. coli*, yeasts such as *Pichia chodati*, *Hansenula anomala*, and *Saccharomyces cerevisiae*, and molds including *Aspergillus flavus*, *A. niger*, *Penicillium chrysogenum*, *Rhizopus senti*, *Botrytis cinerea*, *Byssochlamys fulva*, and *Alternaria sp*.

Of the various compounds included within the scope of the invention, the dihydrocinnamyl-substituted monophenols display particularly high antibiotic activity against a large variety of different microorganisms, and therefore are preferred with respect to the dihydrocinnamyl derivatives of di- or triphenols.

As evident from the explanation immediately following Formula I above, the invention includes compounds wherein there may be nuclear lower alkyl or lower alkoxy substituents in addition to the hydroxy groups. In general, the compounds are preferred wherein such additional substituents are absent or, if present, are in small number, e.g., a total of one to two lower alkyl and/or lower alkoxy substituents. Taking the foregoing facts into consideration, we prefer to employ the compounds of the sub-generic category represented by the formula

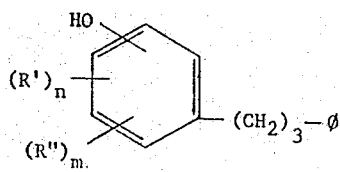

wherein
R' is lower alkyl,
R'' is lower alkoxy,
n is an integer from 0 to 2,
m is an integer from 0 to 2, and
the sum of n and m is not more than 2.

The compounds of the invention may be synthesized by known procedures. A typical plan is to first prepare a cinnamylsubstituted phenol, and then to hydrogenate this intermediate to form the dihydrocinnamyl-substituted phenol.

The intermediate may be prepared by the procedures of Hurd et al., Jour. Am. Chem. Soc., Vol. 59, pp. 107–109; Barnes et al., Tetrahedron, Vol. 21, pp. 2,707–2,715; Jurd, Experientia, Vol. 24, pp. 858–860; Jurd, Tetrahedron, Vol. 25, pp. 1,407–1,416; and Jurd, Tetrahedron Letters No. 33, pp. 2,863–2,866. Typically, these syntheses involve condensing a selected phenol (phenol itself, a cresol, resorcinol, guaiacol, hydroquinone monomethyl ether, etc.) with cinnamyl bromide or cinnamyl alcohol.

In a next step, the cinnamyl-phenol intermediate is subjected to standard procedures to hydrogenate the ethylenic linkage whereby to produce a dihydrocinnamyl-phenol. Generally, this involves treating the cinnamylphenol with hydrogen gas in the presence of a suitable catalyst, such as platinum oxide, palladium on charcoal, and the like. Typically, 10–20 grams of a cinnamylphenol is dissolved in 50–100 milliliters of a non-hydrogenatable organic solvent, such as acetic acid, tetrahydrofuran, and the like, and 0.1 to 1.0 gram of the catalyst is added. Then, hydrogen gas is applied at approximately 30–50 pounds per square inch. The dihydro derivative can be purified by common techniques, for example, distillation or crystallization.

In the copending application of Leonard Jurd et al., Ser. No. 74,485, filed Sept. 22, 1970, issued July 10, 1973, as U.S. Pat. No. 3,745,222 there are described certain cinnamyl phenols which are useful as antimicrobial agents. The said cinnamyl phenols have the structure

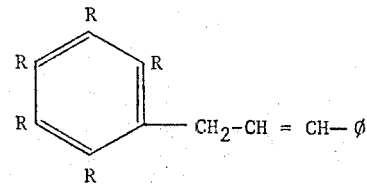

wherein at least one but not more than three of the R's are hydroxy radicals, and the remainder of the R's are each independently selected from the group consisting of lower alkyl, lower alkoxy, and hydrogen. It should be noted that the compounds of Ser. No. 74,485 contain the unsaturated side-chain $-CH_2-CH=CH-\phi$, whereas in the compounds of the present invention the corresponding substituent is the saturated group $-CH_2-CH_2-CH_2-\phi$. As such, the instant agents represent a class of compounds totally separate and distinct from those of Ser. No. 74,485. Moreover, the compounds of the present invention provide an advantage in that they are more stable. Since they do not contain ethylenic unsaturation, they are not subject to oxidization when contacted with oxygen, air, or other oxidizing media.

EXAMPLE

The invention is further demonstrated by the following illustrative example.

A series of compounds was assayed for effectiveness against bacteria, yeasts, and molds, using the following test procedure.

All compounds were initially tested at a concentration of 200 or 500 ppm. In some cases, assays also were conducted with varying amounts of the compounds to determine the minimum concentration thereof required to inhibit growth.

Plates were prepared by adding a measured amount of the candidate compound in acetone solution to 10 ml. of sterilized medium, mixing thoroughly, pouring into 60 × 15 mm. plastic petri dishes, and allowing the gel to set and age overnight. The plates were then inoculated with the test organisms. In the case of bacteria and yeasts, the inoculation was done by the Lederberg and Lederberg (J. Bacteriol., 63, 399, 1952) replica plating technique, applying nine bacteria or seven yeasts on each plate. In the case of molds, drops of homogenized culture were placed on the surface of the plates, applying three or four molds per plate. The media used were: plate count agar (Difco), pH 7.0, for bacteria; and potato dextrose agar (Difco), pH 5.6, for yeasts and molds. Inoculated control plates were also prepared with media containing the largest amount of acetone (0.8 ml.) used in the preparation of the test plates. We have determined that acetone has a minimal influence on the growth of organisms in this procedure. The plates were incubated at 28° for 1–5 days and evaluated by comparison with the controls.

The results obtained are summarized in the following tables. In these tables the compounds are designated in abbreviated manner using "DH" for dihydro, "CA" for cinnamyl, and "PH" for phenol. Thus, for example, dihydro-4-cinnamyl-phenol is designated as DH-4-CA-PH; dihydro-2-cinnamyl-4-isopropylphenol is designated as DH-2-CA-4-isopropyl-PH.

TABLE II

Minimal Inhibitory Concentration (in ppm.) of Dihydro-4-cinnamyl Phenol on Growth of Gram-negative Bacteria

| Bacteria | Minimal inhibitory conc. of DH-4-CA-PH, ppm. |
|---|---|
| Alcaligenes faecalis B-170 | 200 |
| Escherichia coli ML30 | 200 |
| Pseudomonas aeruginosa III | 200 |
| Salmonella typhimurium Tm 1 | 200 |
| Serratia marcescens | 200 |

TABLE I

Minimal Inhibitory Concentrations (in ppm) of Dihydrocinnamyl Phenols on Growth of Gram-positive Bacteria

| Compound | Bacillus cereus 2006 | Sarcina lutea | Staph. aureus SG8A | Strep. lactis |
|---|---|---|---|---|
| DH-4-CA-PH | 25 | 25–50 | 25–50 | 25 |
| DH-2-CA-PH | 12 | 25 | 25 | 12 |
| DH-2-CA-4-methyl-PH | 12 | 12 | 12 | 12 |
| DH-4-CA-2-methyl-PH | 12 | 12 | 12 | 12 |
| DH-2-CA-4-ethyl-PH | 12 | 12 | 12 | 12 |
| DH-2-CA-4-n-propyl-PH | 25 | 12 | 12 | 12 |
| DH-2-CA-4-isopropyl-PH | 12 | 25 | 12–25 | 12 |
| DH-4-CA-3-methyl-6-isopropyl-PH | +* | + | + | |
| DH-2-CA-4-methoxy-PH | 13 | 12 | 25–50 | 25 |

*The symbol + indicates complete inhibition of growth at a concentration of 500 ppm. The compound in question was not tested at lower concentration.

TABLE III

Minimal Inhibitory Concentrations (in ppm.) of Various Dihydrocinnamyl Phenols on Growth of Yeasts

| Compound | Zygosaccharomyces japonicus C-124 | Candida tropicalis C-147 | Pichia chodati var. fermentans C-238 | Hansenula anomala | Saccharomyces cerevisiae var. ellipsoideus Y-44 | Torula utilis NRRL Y-660 |
|---|---|---|---|---|---|---|
| DH-4-CA-PH | 25 | 25 | 50 | 50 | 25 | 25 |
| DH-2-CA-PH | 12 | 12 | 50 | 25 | 12 | 25 |
| DH-2-CA-4-methyl-PH | 12 | 12 | —* | 25 | | 12 |
| DH-4-CA-2-methyl-PH | 12 | 12 | >200* | 100 | 12 | >200 |
| DH-2-CA-4-ethyl-PH | 12–25 | 12–25 | — | — | 50 | 100 |
| DH-2-CA-4-methoxy-PH | 25 | 25 | — | 50 | 25 | 200 |

*The symbol "—" indicates no growth inhibition at conc. of 500 ppm. The term ">200" indicates growth not inhibited with 200 ppm. (highest concentration tested in this case).

TABLE IV

Minimal Concentrations (in ppm.) of Various Dihydrocinnamyl Phenols on Growth of Molds

| Compound | Aspergillus flavus NRRL 3145 | Aspergillus niger A-7705 | Penicillium chrysogenum 52 | Rhizopus senti NRRL 2868 | Botrytis cinerea NRRL 3492 | Byssochlamys fulva NRRL 3493 | Alternaria sp. |
|---|---|---|---|---|---|---|---|
| DH-4-CA-PH | 200 | 50–100 | 25 | 50 | 12–25 | 50 | 25 |
| DH-2-CA-PH | 50 | 50 | 25 | 25 | 12 | 25 | 25 |
| DH-2-CA-4-methyl-PH | >200* | >200 | 200 | 100 | >200 | >200 | 100 |
| DH-4-CA-2-methyl-PH | 200 | >200 | 25 | 50 | 25 | 25–50 | 25–50 |
| DH-2-CA-4-ethyl-PH | —* | — | >200 | — | 100–200 | >200 | >200 |
| DH-2-CA-4-isopropyl-PH | >200 | >200 | — | >200 | 100 | — | — |
| DH-2-CA-4-methoxy-PH | — | — | >200 | 100 | 200 | 200 | 200 |

*The symbol "—" indicates no growth inhibition at concentration of 500 ppm. The term ">200" indicates growth not inhibited at 200 ppm. (highest concentration tested in this case).

Having thus described the invention, what is claimed is:

1. A composition of matter consisting essentially of
   a. a major proportion of a substance normally subject to spoilage by microorganisms selected from the group consisting of bacteria, yeasts, and molds, and
   b. a minor proportion, effective to inhibit the growth of said microorganisms, of a compound of the structure

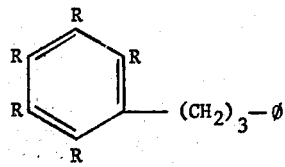

wherein at least one but not more than three of the R's are hydroxy radicals, and the remainder of the R's are each independently chosen from the group consisting of lower alkyl, lower alkoxy, and hydrogen.

2. The composition of claim 1 wherein the compound is dihydro-4-cinnamyl phenol.
3. The composition of claim 1 wherein the compound is dihydro-2-cinnamyl phenol.
4. The composition of claim 1 wherein the compound is dihydro-2-cinnamyl-4-methylphenol.
5. The composition of claim 1 wherein the compound is dihydro-4-cinnamyl-2-methylphenol.
6. The composition of claim 1 wherein the compound is dihydro-2-cinnamyl-4-ethylphenol.
7. The composition of claim 1 wherein the compound is dihydro-2-cinnamyl-4-propylphenol.
8. The composition of claim 1 wherein the compound is dihydro-2-cinnamyl-4-isopropylphenol.
9. The composition of claim 1 wherein the compound is dihydro-4-cinnamyl-3-methyl-6-isopropylphenol.
10. The composition of claim 1 wherein the compound is dihydro-2-cinnamyl-4-methoxyphenol.

* * * * *